US009408764B2

(12) United States Patent  
LaPointe

(10) Patent No.: US 9,408,764 B2  
(45) Date of Patent: Aug. 9, 2016

(54) FURNITURE MEMBER AND POWER LIFT MECHANISM

(71) Applicant: La-Z-Boy Incorporated, Monroe, MI (US)

(72) Inventor: Larry P. LaPointe, Temperance, MI (US)

(73) Assignee: La-Z-Boy Incorporated, Monroe, MI (US)

( * ) Notice: Subject to any disclaimer, the term of this patent is extended or adjusted under 35 U.S.C. 154(b) by 0 days.

(21) Appl. No.: 14/607,565

(22) Filed: Jan. 28, 2015

(65) Prior Publication Data

US 2015/0145291 A1     May 28, 2015

Related U.S. Application Data

(62) Division of application No. 13/611,873, filed on Sep. 12, 2012, now Pat. No. 8,991,925.

(51) Int. Cl.

| *A61G 5/14* | (2006.01) |
|---|---|
| *A47C 1/022* | (2006.01) |
| *F16B 4/00* | (2006.01) |
| *A61G 5/12* | (2006.01) |

(52) U.S. Cl.  
CPC . *A61G 5/14* (2013.01); *A47C 1/022* (2013.01); *F16B 4/004* (2013.01); *A61G 2005/127* (2013.01); *Y10T 29/49945* (2015.01)

(58) Field of Classification Search  
CPC .... A61G 5/14; A61G 2005/127; F16B 4/004; Y10T 29/49945; A47C 1/022  
See application file for complete search history.

(56) References Cited

U.S. PATENT DOCUMENTS

| 4,852,939 | A | | 8/1989 | Krauska |
| 5,288,126 | A | | 2/1994 | Saul et al. |
| 5,466,046 | A | * | 11/1995 | Komorowski ....... A47C 1/0345 297/325 |
| 5,730,494 | A | | 3/1998 | LaPointe et al. |
| 5,806,920 | A | | 9/1998 | Blount |
| 5,931,532 | A | | 8/1999 | Kemmerer et al. |
| 5,992,931 | A | | 11/1999 | LaPointe et al. |
| 6,000,758 | A | | 12/1999 | Schaffner et al. |
| 7,543,885 | B2 | | 6/2009 | Pollard et al. |
| 7,575,279 | B2 | | 8/2009 | Robertson |

(Continued)

OTHER PUBLICATIONS

International Search Report and Written Opinion of the International Searching Authority for PCT/US2015/047092 mailed Nov. 3, 2015.

(Continued)

*Primary Examiner* — Philip Gabler  
(74) *Attorney, Agent, or Firm* — Harness, Dickey & Pierce, P.L.C.

(57) ABSTRACT

A lift chair includes a frame assembly including a chair portion rotatable with respect to a base portion. A lift mechanism portion is positioned in a base portion cavity. The lift mechanism portion includes a lift motor and a drive assembly connected to the lift motor having a slide. A lift tube connects the slide to the chair portion. The lift tube upon actuation of the lift motor displaces the chair portion between a nominal and a full lift position by slide displacement in a slide lifting direction. First and second guide members are positioned on opposite sides of the drive assembly and connected to a base portion base platform. The lift tube is connected to both the first and second guide members to distribute a weight load from the chair portion via the lift tube to the slide, and by the guide members to the base platform.

17 Claims, 19 Drawing Sheets

(56) References Cited

U.S. PATENT DOCUMENTS

| | | |
|---|---|---|
| 7,631,937 B2 | 12/2009 | Robertson |
| 7,699,389 B2 | 4/2010 | Robertson |
| 7,735,912 B2 | 6/2010 | Robertson |
| 7,766,421 B2 | 8/2010 | Lawson |
| 2005/0104430 A1 | 5/2005 | Splane |
| 2009/0102259 A1 | 4/2009 | Robertson |
| 2011/0121625 A1 | 5/2011 | Lipford |
| 2011/0193373 A1 | 8/2011 | Lawson et al. |
| 2013/0062914 A1 | 3/2013 | Marshall et al. |
| 2014/0070585 A1 | 3/2014 | LaPointe |

OTHER PUBLICATIONS

International Search Report and Written Opinion regarding PCT/US2013/056948 mailed Nov. 12, 2013, ISA/KR, Daejeon, Republic of Korea.

Office Action regarding U.S. Appl. No. 13/611,873 mailed Aug. 1, 2014.

\* cited by examiner

FURNITURE MEMBER AND POWER LIFT MECHANISM

CROSS-REFERENCE TO RELATED APPLICATIONS

This application is a divisional of U.S. patent application Ser. No. 13/611,873 filed on Sep. 12, 2012. The entire disclosure of the above application is incorporated herein by reference.

FIELD

The present disclosure relates to furniture members and, in particular, to chairs having a power lift mechanism to assist occupant entrance and exit to and from the chair.

BACKGROUND

This section provides background information related to the present disclosure which is not necessarily prior art.

Power lift chairs are known that provide motor operated transition between a seated position of an occupant to a lift position which provides approximately 50 percent or more of a transition from a seated to an occupant standing position for occupants who have difficulty directly standing from a fully seated position.

Known power lift chair designs can impede placement of the occupant's feet in a position close to the center of gravity of the occupant and, therefore, require greater that necessary leg strength of the occupant to stand even when at a full lift position of the chair. In addition, known power lift chair designs have complicated operating mechanisms that are expensive to build and therefore result in a high cost of purchase. Further, known power lift chair designs do not provide for multiple chair positions that maximize occupant choice of seating and/or leg rest positions.

SUMMARY

This section provides a general summary of the disclosure, and is not a comprehensive disclosure of its full scope or all of its features.

According to several aspects of the present disclosure, a lift chair includes a rotatable frame assembly including a chair portion rotatable with respect to a base portion. A mechanism has a lift mechanism portion positioned in a cavity of the base portion. The lift mechanism portion includes a lift motor. A drive assembly connected to the lift motor has a slide displaceable in each of a slide lifting direction and oppositely in a slide returning direction by selective operation of the lift motor. A lift tube is connected at a first end to the slide and connected at a second end to the chair portion. The lift tube, upon actuation of the lift motor, acts to displace the chair portion between a nominal position and a full lift position by displacement of the slide in the slide lifting direction.

According to further aspects, the lift mechanism portion includes a lift motor. A drive assembly having a slide is connected to the lift motor. A lift tube connects the slide to the chair portion. The lift tube, upon actuation of the lift motor, acts to displace the chair portion between a nominal position and a full lift position by displacement of the slide in a slide lifting direction. First and second guide members are positioned on opposite sides of the drive assembly and are connected to a base platform of the base portion. The lift tube is further connected to both the first and second guide members to distribute a weight load from the chair portion via the lift tube to the slide, and by the first and second guide members to the base platform.

According to additional aspects, a lift chair includes a rotatable frame assembly including a chair portion and a base portion. A support tube connected to the chair portion has first and second extending portions extending outward of the chair portion, each rotatably connected to the base portion, permitting the chair portion to rotate with respect to the base portion. A mechanism has a leg rest mechanism portion connected to the chair portion and a lift mechanism portion supported by the base portion. The leg rest mechanism portion includes a leg rest drive motor connected to a drive rod rotated by operation of the leg rest drive motor to extend and retract first and second pantograph linkage sets connected to the drive rod. The first and second pantograph linkage sets are also connected to and supported by the support shaft.

According to additional aspects, a lift chair includes a rotatable frame assembly including a chair portion rotatable with respect to a base portion. The base portion has opposed and parallel first and second base frame members oriented perpendicular to a base platform. A mechanism has a lift mechanism portion positioned in a cavity of the base portion between the first and second base frame members. The lift mechanism portion includes a lift motor and a lift tube connected between the lift motor and the chair portion. The lift tube, upon actuation of the lift motor, acts to displace the chair portion between a nominal position and a full lift position. An intersecting corner of each of the first and second base frame members is defined where a frame member forward edge of each of the first and second base frame members intersects with the base platform. The intersecting corner of each of the base frame members is spatially and rearwardly positioned with respect to a forward edge of the base platform.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
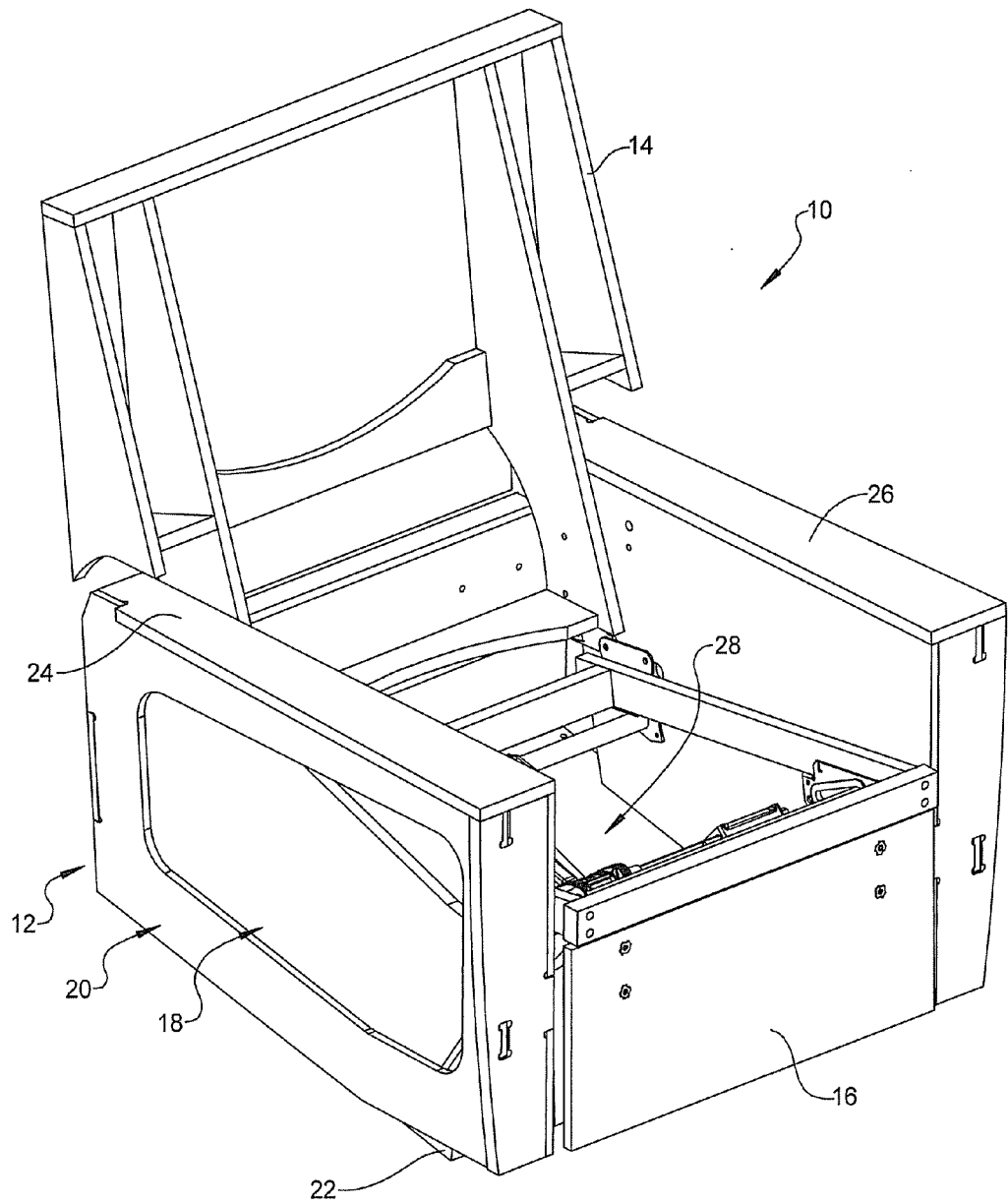
FIG. 1 is a front right perspective view of a furniture member having a power lift mechanism shown in a nominal seating position.

Referring to FIG. 1, a lift chair 10 includes a rotatable frame assembly 12 having a seat back assembly 14 rotatably connected to frame assembly 12, and a leg rest member 16 connected to and extendable/retractable with respect to frame assembly 12. The frame assembly 12 includes a base portion 18 which is positioned interior to and rotatable with respect to a chair portion 20. For clarity, lift chair 10 is not shown with seat support springs, padding, or upholstery which are commonly applied to lift chairs as known in the art. The lift chair 10 is supported on a floor or planar surface using a square or rectangular shaped base platform 22 which according to several embodiments is included with base portion 18. The chair portion 20 further includes each of a first arm rest portion 24, corresponding to a right side of an occupant seated in lift chair 10, and a second arm rest portion 26, corresponding to a left side of the seated occupant. Lift chair 10 also includes several components which are movably displaced using a mechanism 28. Mechanism 28 independently or in combination controls: forward and rearward rotational displacement of seat back assembly 14; extension/retraction of the leg rest member 16 between a stowed position shown to an outward extended position, which is shown and described in reference to FIGS. 9 and 10; and rotation of the chair portion 20 upwardly and downwardly with respect to the base portion 18 to provide multiple occupant seating positions and a full lift position.

Referring to FIG. 2 and again to FIG. 1, lift chair 10 is shown following an upward/forward rotation from the nominal seating position of FIG. 1 to a maximum lift position which accommodates user exit or entrance from/to the lift chair 10. To rotate lift chair 10 from the nominal seating position defined as a seat back fully upright and leg rest stowed position (shown in FIG. 1) to the lift position (shown in FIG. 2), a lift mechanism portion 30 of mechanism 28 is actuated by the occupant, causing lift and rotation of chair portion 20 with respect to a frame rotational axis 32 which rotates chair portion 20 in a lift rotational direction "A". In the full lift position shown, the seat back assembly 14 is positioned in the fully upright position and leg rest member 16 is positioned in its stowed position. The mechanism 28 further includes a leg rest mechanism portion 34 which will be described in greater detail in reference to FIG. 5, which is not operational during the rotation of chair portion 20 to the full lift position. As also visible in FIG. 2, the chair portion 20 further includes a first inner arm rest member 36 positioned to the occupant's right hand side and a second inner arm rest member 38 positioned to the occupant's left hand side, which are nested between a first base frame member 40 and a second base frame member 42.

Referring to FIG. 3 and again to FIG. 1, components of the lift mechanism portion 30 of mechanism 28 are positioned in a cavity defined between the first and second base frame members 40, 42. The first base frame member 40 is positioned proximate to a base platform first edge 44 of base platform 22, and second base frame member 42 is positioned proximate to a base platform second edge 46 of base platform 22. Each of the first and second base frame members 40, 42 are oriented parallel with respect to each other and substantially perpendicular to base platform 22. A third base frame member 48, defining a rear facing wall of base portion 18, is positioned proximate to a base platform third edge 50 of base platform 22. A plurality of feet 51 are adjustably connected to base platform 22 at each of a plurality of feet positioning apertures 52. Feet 51 allow for ensuring contact and equal support of the four corners of base platform 22.

Each of the first and second base frame members 40, 42 are provided with an intersecting corner 53 where a frame member forward edge 54 of each of the first and second base frame members 40, 42 intersects with base platform 22. The intersecting corner 53 of each of the first and second base frame members 40, 42 is spatially and rearwardly positioned with respect to a base platform forward edge 55 of base platform 22. According to several aspects, first base frame member 40 includes a first receiving face 56 which is oriented parallel with respect to an upper face 58 of base platform 22. The first receiving face 56 is positioned proximate to the frame member forward edge 54 of first base frame member 40. A second receiving face 60 is similarly provided with second base frame member 42, which is oriented parallel with respect to upper face 58 and co-planar with respect to first receiving face 56. A first receiving slot 62, having a generally U-shape, is created downwardly with respect to the first receiving face 56. The first receiving slot 62 receives a first U-shaped journal 64 which is sized to be slidably received in first receiving slot 62 in a downward direction. The first U-shaped journal 64 is integrally included with a first connection member 66 which can be combined as a unitary molded plastic component. Once the first U-shaped journal 64 is received in the first receiving slot 62, connection member fasteners 68 are inserted from the outer side or face of first base frame member 40 and are received in threaded apertures of first connection member 66 to fix the location of first connection member 66.

Figure 6:
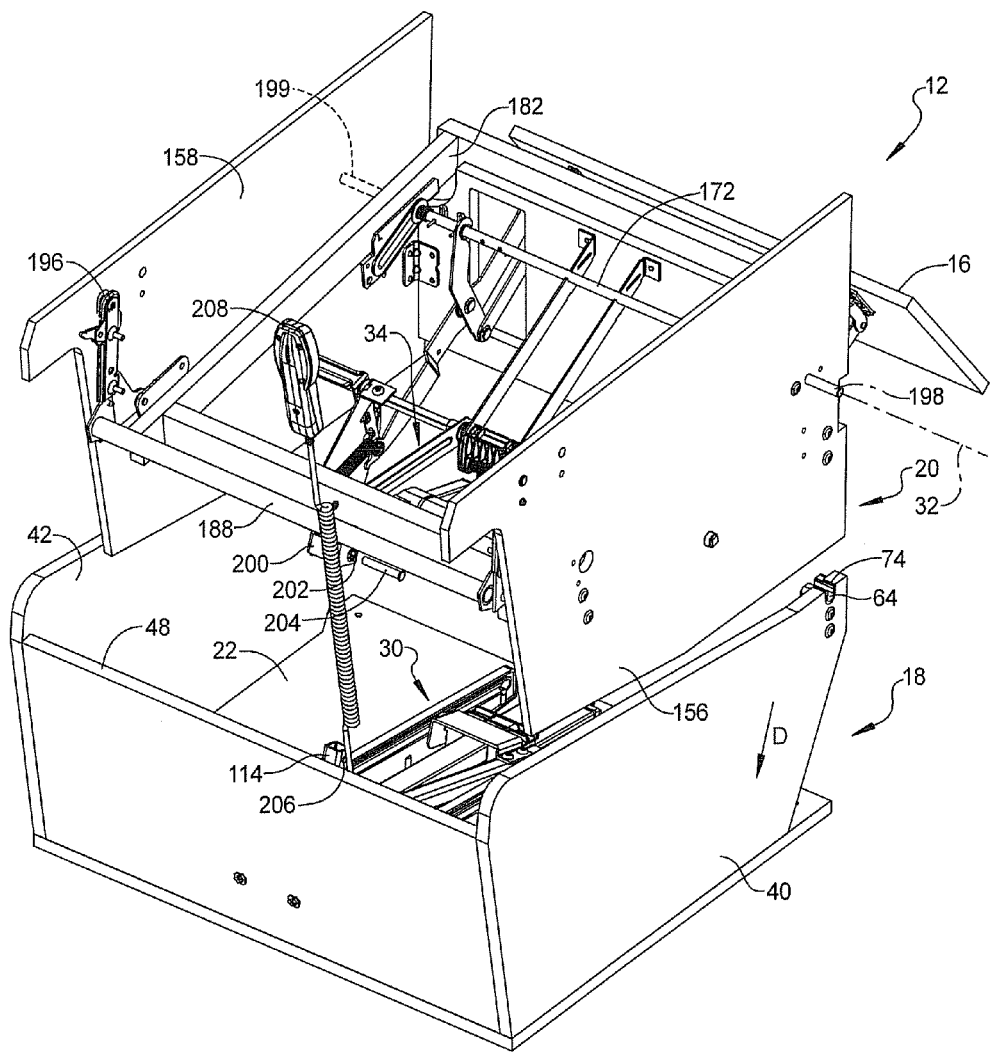
FIG. 6 is a right rear perspective view of the base and chair portions of FIGS. 4 and 5 during assembly.

A second U-shaped journal 70 of a second connection member 72, defining either a duplicate of or a mirror image of first connection member 66, is similarly positioned in a U-shaped second receiving slot created in second receiving face 60 of second base frame member 42. Second connection member 72 is shown in its installed position. In the installed position of both first and second connection members 66, 72, an upper edge 74 of both members is positioned substantially flush with or slightly above the first or second receiving face 56, 60. In addition, the upper edge 74 of both first U-shaped journal 64 and second U-shaped journal 70 may extend partially into the U-shaped slot defined by the U-shaped journal 64, 70. The purpose for this extension will be better described in reference to FIG. 6.

Figure 16:
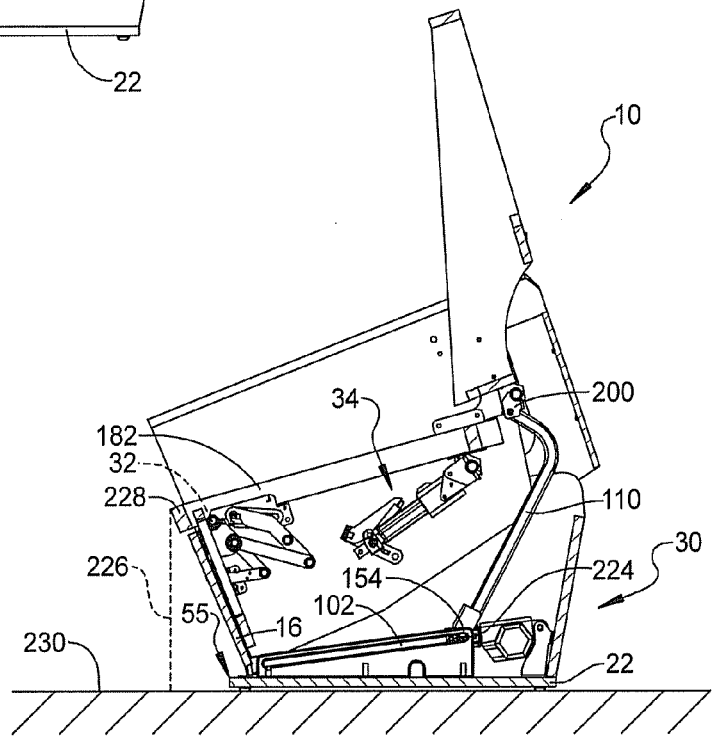
FIG. 16 is a cross sectional side elevational view of the furniture member of FIG. 2 taken at section 16 of FIG. 12.

The frame member forward edge 54 of each of the first and second base frame members 40, 42 defines an acute angle α with respect to a plane defined by upper face 58 of base platform 22. The purpose of angle α will be better described in reference to FIG. 16. It is noted that intersecting corner 53 is recessed rearwardly with respect to base platform forward edge 55 to create angle α.

With continuing reference to FIG. 3 and again to FIG. 1, lift mechanism portion 30 includes a lift motor 76 which according to several aspects is a direct current (DC) motor. A mounting bracket 78 is connected to a forward directed face 80 of third base frame member 48 and also to upper face 58 of base platform 22. Mounting bracket 78 includes coaxial through apertures 82, only one of which is clearly visible in FIG. 3, which slidably receive an assembly mount pin 84 to connect an assembly, including lift motor 76 and a gear housing 86 directly connected to lift motor 76, which includes internal gears (not shown) which drive and are directly connected to an internal worm gear (not shown) of a worm drive assembly 88. It is noted that throughout this disclosure the description of a "worm drive" device or gear is not limiting and can be replaced by other drive devices or gears as are known in the art.

Operation of lift motor 76 slidably displaces a worm gear slide 90 which is slidably disposed on and displaced during operation of the worm gear of worm drive assembly 88 in each of a slide lifting direction "B" or oppositely in a slide returning direction "C". An assembly end 92 of worm drive assembly 88 is connected to upper face 58 of base platform 22 using an assembly end bracket 94. Positioned on opposite sides of worm drive assembly 88 are triangularly shaped first and second guide members 96, 98. According to several aspects, first and second guide members 96, 98 are molded plastic components; however, alternate materials can also be used. First guide member 96 includes a first elongated slot 100, and second guide member 98 includes a second elongated slot 102, both located proximate to an upper wall or edge 103, 103' of first and second guide members 96, 98. Elongated slots 100, 102 are oriented substantially in parallel axial alignment with each other in the installed positions of the first and second guide members 96, 98. Each of the first and second guide members 96, 98 also includes a low elevation end 104 oriented toward the forward or front facing portion of base portion 18 and a high elevation end 106 oriented toward third base frame member 48 or a rear facing end of base portion 18. The elongated slots 100, 102 therefore have a continuous rearward to frontward downward pitch or angle with respect to upper face 58. Each of the first and second guide members 96, 98 also includes a planar support face 108 which rests on and is fastened to the upper face 58 of base platform 22.

Lift mechanism portion 30 further includes a rectangular and hollow metal lift tube 110, which includes a substantially straight first tube portion 112 and a second tube portion 114 which is angularly oriented with respect to first tube portion 112. The lift tube 110 is connected to, and therefore displaces during the sliding motion of worm gear slide 90. A combined weight of a substantial portion of chair portion 20 plus a substantial portion of a weight of the occupant are distributed by lift tube 110 to worm gear slide 90 and thereby to each of the first and second guide members 96, 98 such that bending does not occur within the length of worm drive assembly 88.

To provide a sliding connection between the worm gear slide 90 and each of the first and second guide members 96, 98, two shoulder bolts are provided. A first shoulder bolt 116 includes a bolt head 118, a bolt sleeve 120, and a bolt threaded shank 122 positioned opposite to bolt head 118. During assembly, the bolt threaded shank 122 and bolt sleeve 120 of first shoulder bolt 116 are disposed through elongated slot 100 of first guide member 96. A tube connecting end 124 of lift tube 110 is positioned between a first inside face 126 of first guide member 96 and a first slide face 128 of worm gear slide 90. After the bolt threaded shank 122 and bolt sleeve 120 of first shoulder bolt 116 extend through elongated slot 100, they are slidably disposed through a tube through aperture 130 created in the tube connecting end 124. Bolt threaded shank 122 extends out of tube through aperture 130 and is threadably engaged in a first threaded bore 132 created in the first slide face 128 of worm gear slide 90. Different portions of bolt sleeve 120 are slidably received in elongated slot 100 and rotatably received in the tube through aperture 130, therefore allowing sliding motion of worm gear slide 90 as well as rotation of lift tube 110 with respect to a central axis of first shoulder bolt 116. The sliding contact of first shoulder bolt 116 with walls of first elongated slot 100 therefore distributes half the weight received at worm gear slide 90 to first guide member 96 and base platform 22 at any sliding position of worm gear slide 90.

The lift tube 110 is also connected to second guide member 98 in the following manner. An offset flange 134 is fastenably engaged to the tube connecting end 124 using bracket fasteners 136. The offset flange 134 is integrally connected to a connection bracket 138. Connection bracket 138 is substantially planar such that connection bracket 138 can rest on a plurality of ribs defining a slide surface 140 of worm gear slide 90. A transverse flange 142 is oriented transverse to and integrally connected to connection bracket 138, and contacts a second slide face 144 of worm gear slide 90 which is oriented parallel to, but oppositely facing with respect to first slide face 128. A transverse flange aperture 146 of transverse flange 142 is positioned proximate to a bushing 148 that is disposed between transverse flange 142 and a second inside face 150 of second guide member 98. Bushing 148 has a length which corresponds approximately with a width of lift tube 110, thereby spacing first and second guide members 96, 98 substantially equally about and with respect to worm drive assembly 88. A bushing bore 152 of bushing 148 is coaxially aligned with transverse flange aperture 146 and a second shoulder bolt 154 is assembled similar to first shoulder bolt 116 by extending second shoulder bolt 154 through the elongated slot 102, the bushing bore 152, the transverse flange aperture 146, and a threaded aperture (not visible in this view) created in the second slide face 144 of worm gear slide 90. The second shoulder bolt 154 therefore similarly provides sliding support for half the weight distributed through worm gear slide 90 to second guide member 98 and thereby to base platform 22.

Figure 2:
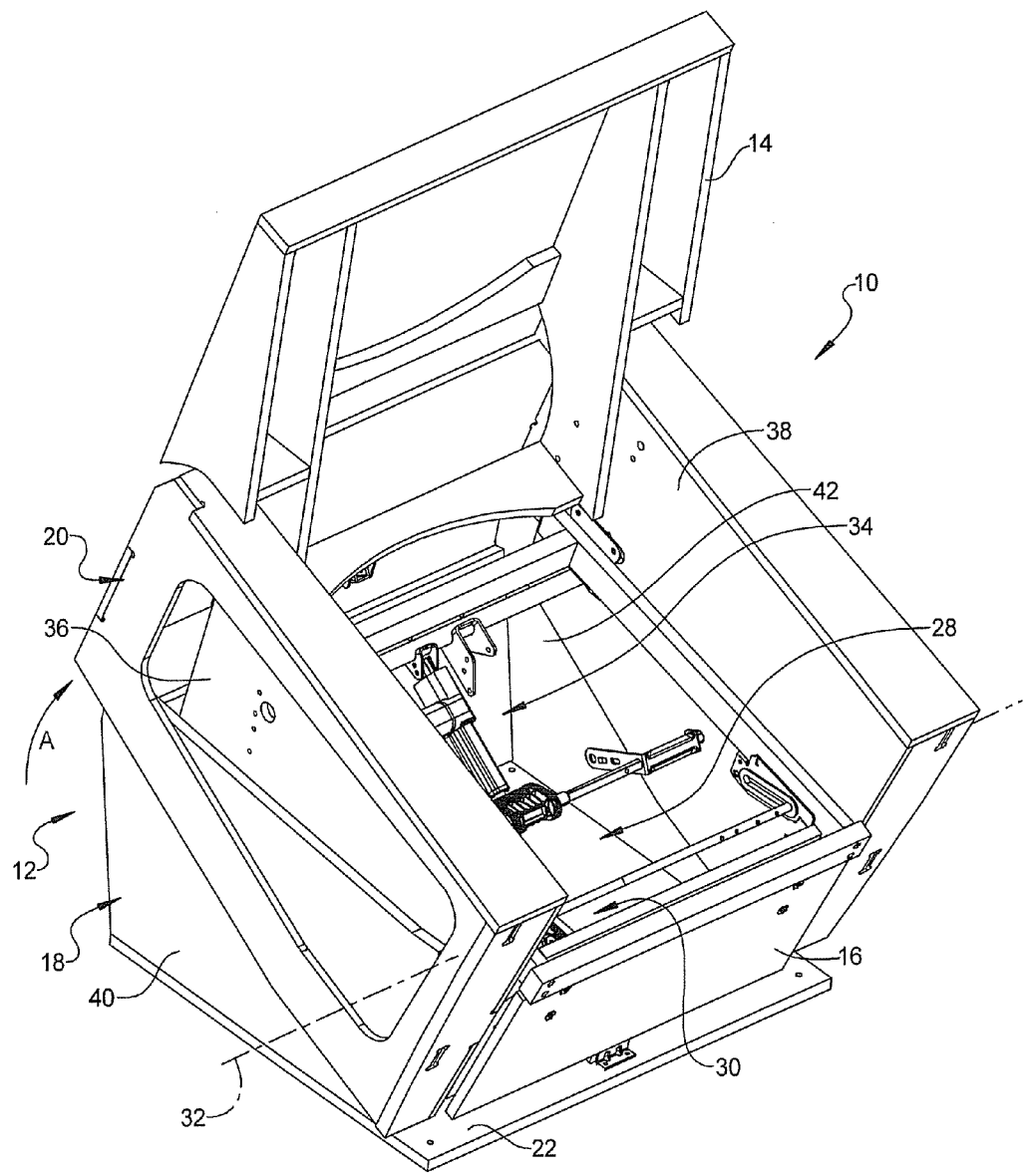
FIG. 2 is the furniture member of FIG. 1 shown in a maximum lift position.
Figure 3:
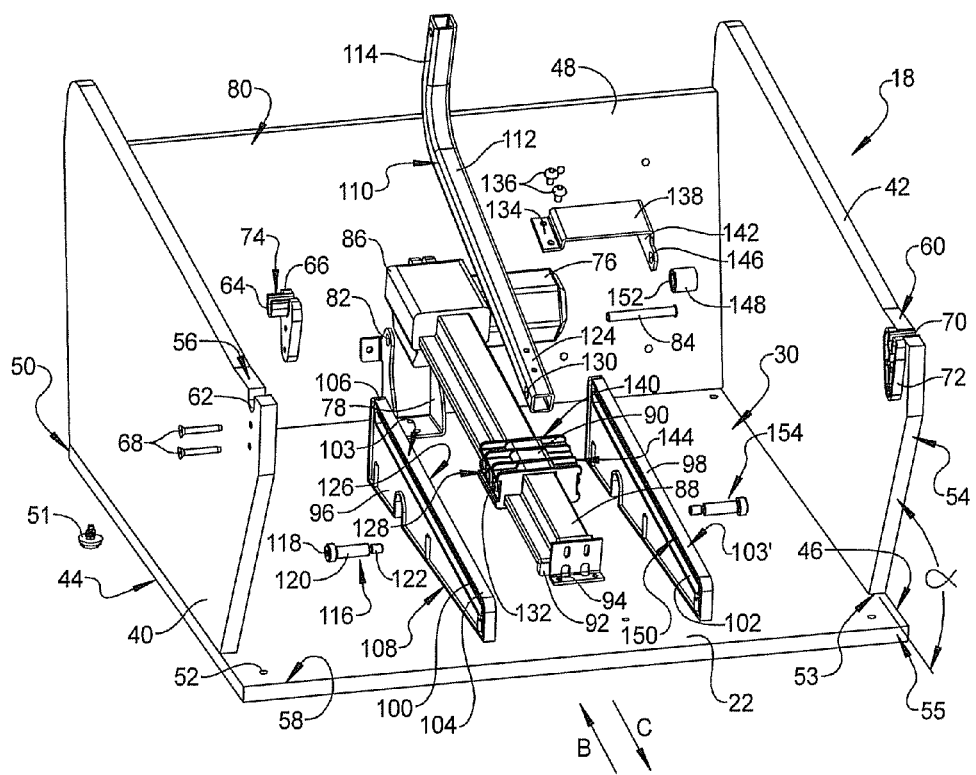
FIG. 3 is a front left perspective view of a base portion of the furniture member of FIG. 1 showing the power lift mechanism in an exploded view.

Referring to FIG. 4 and again to FIGS. 1-3, base portion 18 is shown following the completed assembly of lift mechanism portion 30. In the assembled condition shown, the worm gear slide 90 is positioned in a neutral or nominal position which provides a basic seating position for the occupant of lift chair 10. By subsequent operation of lift motor 76, gear housing 86 and worm drive assembly 88, worm gear slide 90 can be slidably disposed in the slide lifting direction "B" to rearwardly and upwardly displace lift tube 110, establishing the lift chair full lift position shown with respect to FIG. 2. The occupant's weight, transferred via lift tube 110 to worm gear slide 90, is distributed to each of the first and second guide members 96, 98 by the first and second shoulder bolts 116, 154. In the nominal position of worm gear slide 90, the first and second shoulder bolts 116, 154 are positioned approximately two thirds along a length of elongated slots 100, 102 looking forward with respect to lift motor 76. Also, in the nominal position of worm gear slide 90, the connection bracket 138 lays substantially flat with respect to worm gear slide 90. In the completed assembly position of base portion 18, the first and second U-shaped journals 64, 70 are fixed in place, and base portion 18 is therefore ready to receive chair portion 20 as will be described in reference to FIG. 6.

Referring to FIG. 5 and again to FIG. 1, the chair portion 20 is assembled as follows. First and second chair frame members 156, 158 are positioned substantially parallel with respect to each other. A chair frame structural tube 160 is fixed to rearward ends of each of the first and second chair frame members 156, 158 to provide a predetermined frame spacing. A chair frame front connecting member 162 connects forward ends of the first and second chair frame members 156, 158. The leg rest mechanism portion 34 is positioned between and supported by the chair frame structural tube 160 and the chair frame front connecting member 162.

The leg rest mechanism portion 34 includes a leg rest drive motor 164 which according to several aspects is a DC motor. The leg rest drive motor 164 is connected to a drive connecting member 166 which is used to rotate a drive rod 168 using a drive rod connecting member 170. A support shaft 172 is positioned in parallel with drive rod 168 and includes portions which extend outwardly via apertures 173, 173' created in each of the first and second chair frame members 156, 158. The extending portions will be described in better detail in reference to FIG. 6. First and second pantograph linkage sets 174, 176 are each connected to the drive rod 168 and the support shaft 172. Operation of the leg rest drive motor 164 causes extension of the drive rod connecting member 170 which axially rotates drive rod 168. Rotation of drive rod 168 acts to extend or retract each of the first and second pantograph linkage sets 174, 176. The first pantograph linkage set 174 extends through a first clearance opening 178 created in chair frame front connecting member 162. Similarly, the second pantograph linkage set 176 extends through a second clearance opening 180 of chair frame front connecting member 162. Each of the first and second pantograph linkage sets 174, 176 are connected to the leg rest member 16. Extension or retraction of the first and second pantograph linkage sets 174, 176 therefore extends or retracts the leg rest member 16.

Figure 5:
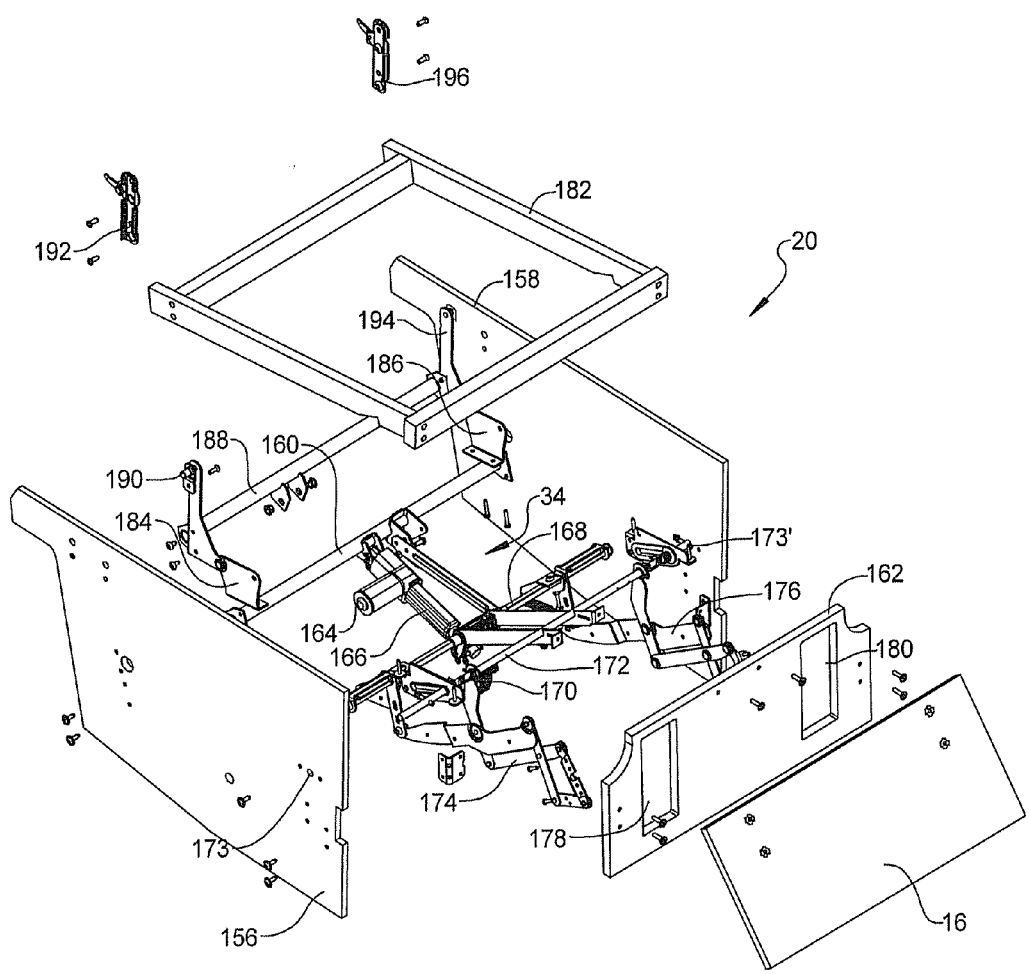
FIG. 5 is a front right perspective exploded assembly view of a chair portion of the furniture member of FIG. 1.

With continuing reference to FIG. 5, chair portion 20 further includes a seat frame 182 which is supported in part on first and second swing assemblies 184, 186 which are rotatably connected to a tube assembly 188. A first rear swing assembly 190 is also connected to tube assembly 188 and a first back bracket assembly 192 is connected to first rear swing assembly 190. Similarly, a second rear swing assembly 194 is also connected to tube assembly 188 and a second back bracket assembly 196 is connected to the second rear swing assembly 194. The first and second back bracket assemblies 192, 196 are used to releasably connect the seat back assembly 14. Rotation of the tube assembly 188 with respect to first and second rear swing assemblies 190, 194 displaces the first and second swing assemblies 184, 186, which displace the seat frame 182 either forwardly or rearwardly.

Referring to FIG. 6 and again to FIGS. 1-5, frame assembly 12 is assembled by inserting the assembled chair portion 20 into the assembled base portion 18 by loading the chair portion 20 in a downward installation direction "D" until a first shaft extension portion 198 and a second shaft extension portion 199 (shown in phantom in FIG. 6), which are integral, extending portions of support shaft 172, are received in the individual first and second U-shaped journals 64, 70 (only first U-shaped journal 64 is clearly visible in this view). By downwardly pressing the first and second shaft extension portions 198, 199 past the upper edges 74 which extend partially into the first and second U-shaped journals 64, 70 providing a clearance less than a diameter of the first and second shaft extension portions 198, 199, the first and second shaft extension portions 198, 199 will snap into position within first and second U-shaped journals 64, 70, defining a frictional snap fit, and thereafter the upper edge 74 resists removal of the shaft extension portions 198, 199. A material of the U-shaped journals 64, 70 is selected to provide a low coefficient of friction and, as such, can be a polyamide or a polytetraflouroethylene material or similar polymeric material to provide minimal resistance to rotation of chair portion 20 with respect to base portion 18.

To assemble the chair portion 20 to the base portion 18, after the chair portion 20 is received within base portion 18, the first shaft extension portions 198, 199 are individually and sequentially (in any order) snapped in the individual first and second U-shaped journals 64, 70. The second tube portion 114 of lift tube 110 is then positioned in a clevis 200 fixed to the tube assembly 188. A clevis through aperture of an insulating bushing 202 receives a tube mounting pin 204 which is also extended through a second tube aperture 206 created in second tube portion 114 such that second tube portion 114 is rotatably connected to the clevis 200. Tube mounting pin 204 can be retained after insertion using a standard hairpin clip (not shown). Although additional structural members can be used to connect first and second chair frame members 156, 158, the third base frame member 48 of base portion 18 substantially provides a rear wall when the chair portion 20 is received in base portion 18. A motor control fob 208 is then connected to the mechanism 28 for selective operation by the occupant in directing operation of either or both the lift mechanism portion 30 and/or leg rest mechanism portion 34. At this time, the leg rest member 16 is free to extend in a forward direction by operation of the leg rest mechanism portion 34.

Referring to FIG. 7 and again to FIG. 1, lift chair 10 can be moved from the nominal position shown in FIG. 1 to a forward lift position shown in FIG. 7 by operation of the lift mechanism portion 30 which causes a forward rotation of chair portion 20 with respect to frame rotational axis 32. Each of the first and second arm rest portions 24, 26 includes an arm rest outer frame 210 having a first frame lower face 212 at a rearward end of arm rest outer frame 210 and a second frame lower face 214 positioned toward a forward end of arm rest outer frame 210. The first frame lower face 212 is oriented at an angle with respect to second frame lower face 214. As the chair portion 20 is rotated in the lift rotational direction "A", the second frame lower face 214 is brought into parallel alignment with base platform 22, and the first frame lower face 212 is raised with respect to the base platform third edge 50. In this forward lift position, the seat back assembly 14 is in its upright position, and the leg rest member 16 is in its stowed position.

Figure 7:
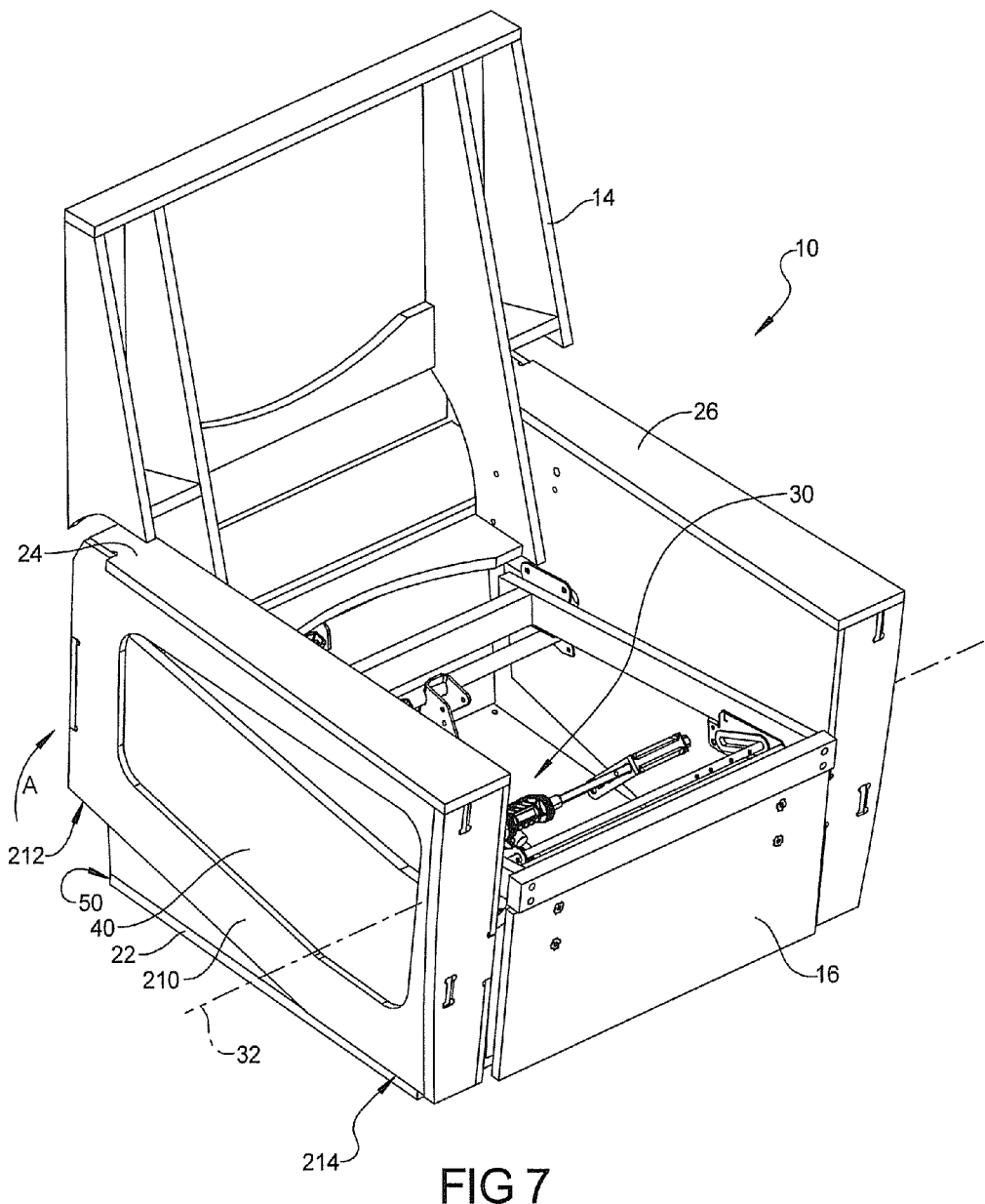
FIG. 7 is a front right perspective view of the furniture member of FIG. 1 in a forward lift position.

Referring to FIG. 8 and again to FIGS. 1 and 7, lift chair 10 can also be positioned in a rearward tilt position by operation of lift mechanism portion 30. As chair portion 20 is rotated in a chair downward rotational direction "E" with respect to frame rotational axis 32, the first frame lower face 212 is brought into parallel alignment with base platform 22, and the second frame lower face 214 is raised with respect to base platform 22. By further operation of lift mechanism portion 30, seat back assembly 14 is rotated in a seat back reclining direction "F", which directly results in a forward displacement of the seat frame 182 in a seat frame extending direction "G". The forward displacement of seat frame 182 is caused by rotation/displacement of the tube assembly 188 during operation of lift mechanism portion 30. At this time, the leg rest member 16 is still in its stowed position. Operation of the leg rest mechanism portion 34 is therefore not required to reach the lift chair rearward tilt and seat back assembly rearward reclined positions shown.

Referring to FIG. 9 and again to FIGS. 1, 3, and 7-8, from the nominal position of lift chair shown in FIG. 1 with the seat back assembly 14 in the fully upright position, the leg rest member 16 can be extended by operation of leg rest mechanism portion 34. Operation of leg rest drive motor 164 causes extension of the first and second pantograph linkage sets 174, 176 (only first pantograph linkage set 174 is shown for clarity). The leg rest member 16 can be extended without repositioning seat frame 182.

Figure 9:
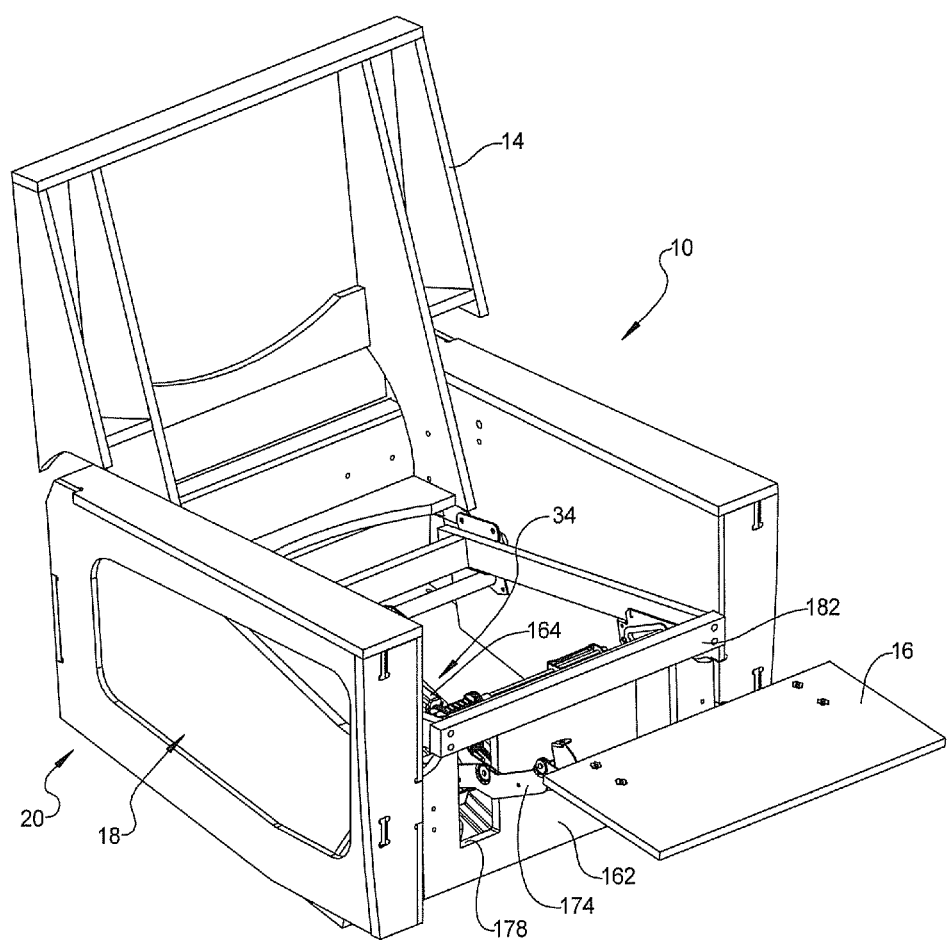
FIG. 9 is a front right perspective view of the furniture member of FIG. 1 in a leg rest extended position.
Figure 10:
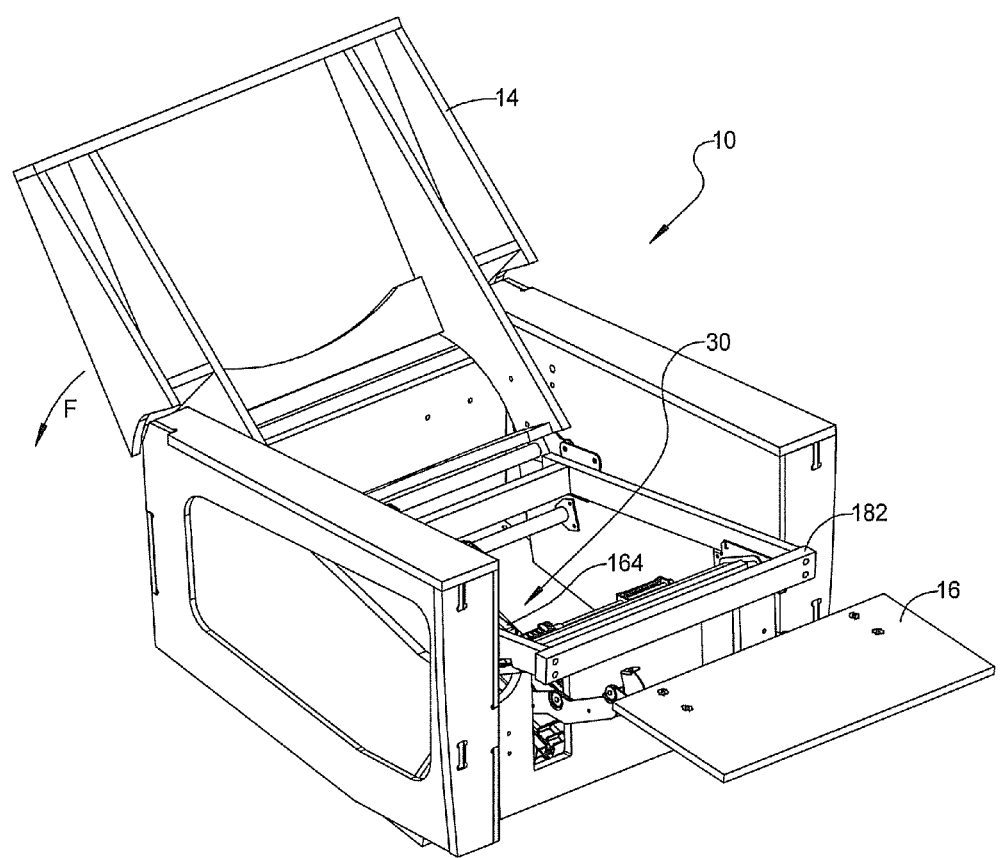
FIG. 10 is a front right perspective view of the furniture member of FIG. 1 in a seatback rotated and leg rest extended position.

Referring to FIG. 10 and again to FIG. 9, with the leg rest member 16 in the fully extended position, additional operation of lift mechanism portion 30 can be used to rotate the seat back assembly 14 from the fully upright to the seat back reclined position in the seat back reclining direction "F". In this position, seat back assembly 14 is fully rotated in the seat back reclining direction "F", the seat frame 182 is extended forwardly, and leg rest member 16 is fully extended.

Figure 11:
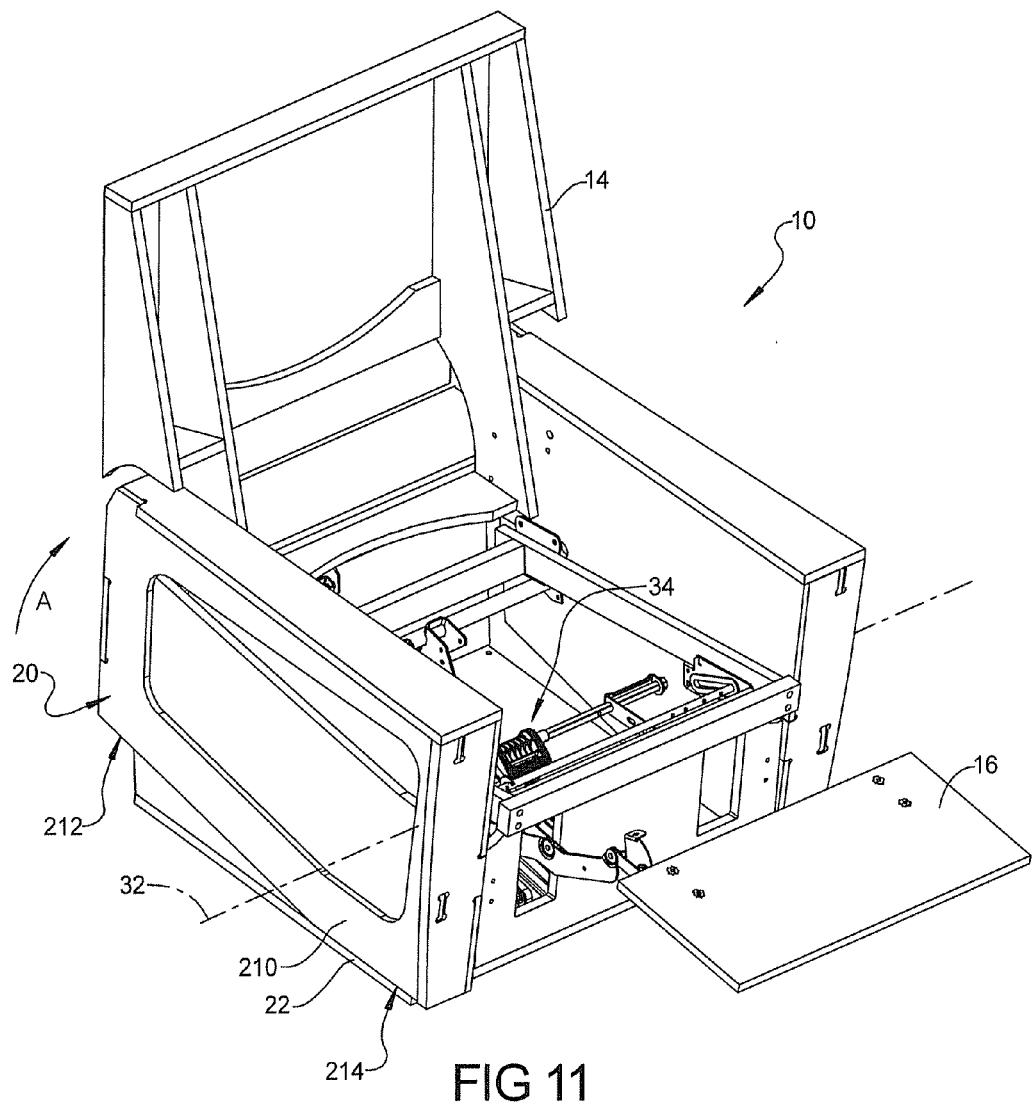
FIG. 11 is a front right perspective view of the furniture member of FIG. 9 in the leg rest extended and further in a forward lift position.

Referring to FIG. 11 and again to FIG. 7, with lift chair 10 already positioned in the forward lift position, the leg rest member 16 can be extended by operation of leg rest mechanism portion 34 either before or after rotation of chair portion 20 in the lift rotational direction "A" to the forward lift position. Again, in the forward lift position, the second frame lower face 214 of arm rest outer frames 210 are oriented substantially parallel or in direct contact with base platform 22, and the first frame lower face 212 is elevated with respect to base platform 22. From this position, either the chair portion 20 can be returned to the nominal position shown in FIG. 1 before the return of leg rest member 16 to the stowed position, or leg rest member 16 can be returned to the stowed position before chair portion 20 is returned to the nominal position.

Figure 12:
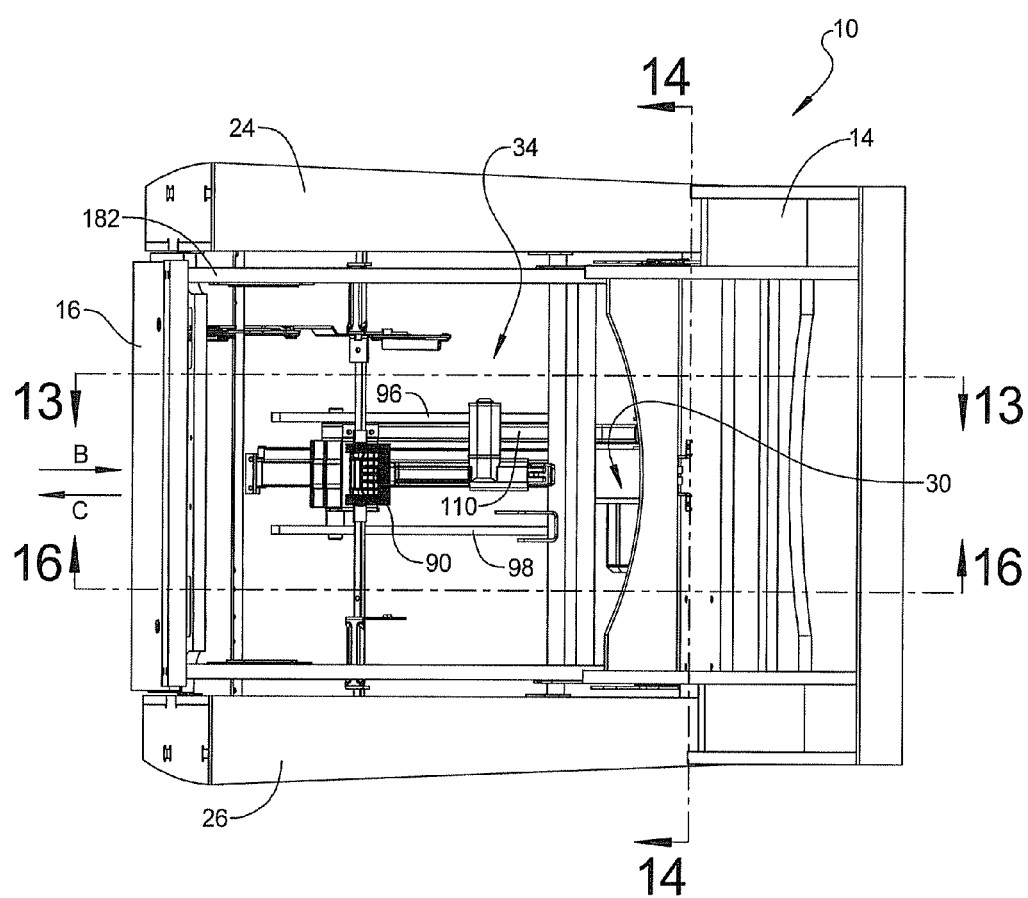
FIG. 12 is a top plan view of the furniture member of FIG. 1.

Referring to FIG. 12 and again to FIGS. 1 and 3, in the lift chair nominal position, the occupant seated on seat frame 182 has his or her weight distributed substantially onto worm gear slide 90 and thereby to each of the first and second guide members 96, 98. During operation of lift mechanism portion 30 in either of the slide lifting direction "B" or slide returning direction "C", the weight of the occupant remains substantially supported over worm gear slide 90 by distribution of the weight via lift tube 110.

Referring to FIG. 13 and again to FIGS. 1, 3, 5 and 12, in the lift chair nominal position with the seat back assembly 14 in the fully upright position and the leg rest member 16 in the stowed position, a chair frame rear wall/connecting member 216 of chair portion 20 extends below and rearwardly of third base frame member 48. A frame member lower end 218 of chair frame rear connecting member 216 is positioned substantially below an upper end 220 of the third base frame member 48. Also, as previously noted, in the nominal lift chair seating position the first shoulder bolt 116 (and second shoulder bolt 154, not visible in this view) is positioned substantially two thirds of the length of elongated slot 100 with respect to a rear-to-front orientation of elongated slot 100. The chair portion defines a four-sided wood structure, including: the first and second chair frame members 156, 158 oriented parallel to each other; the rear wall member 216 connected to and oriented perpendicular to the first and second chair frame members 156, 158; and the front wall member 162 connected to and oriented perpendicular to the first and second chair frame members 156, 158. The base portion 18 also defines a four-sided wood structure, including: the first and second base frame members 40, 42 oriented parallel to each other; the rectangular shaped base platform 22 oriented perpendicular to the first and second base frame members 40, 42; and the third base frame member 48 defining the rear facing wall of the base portion 18.

Figure 13:
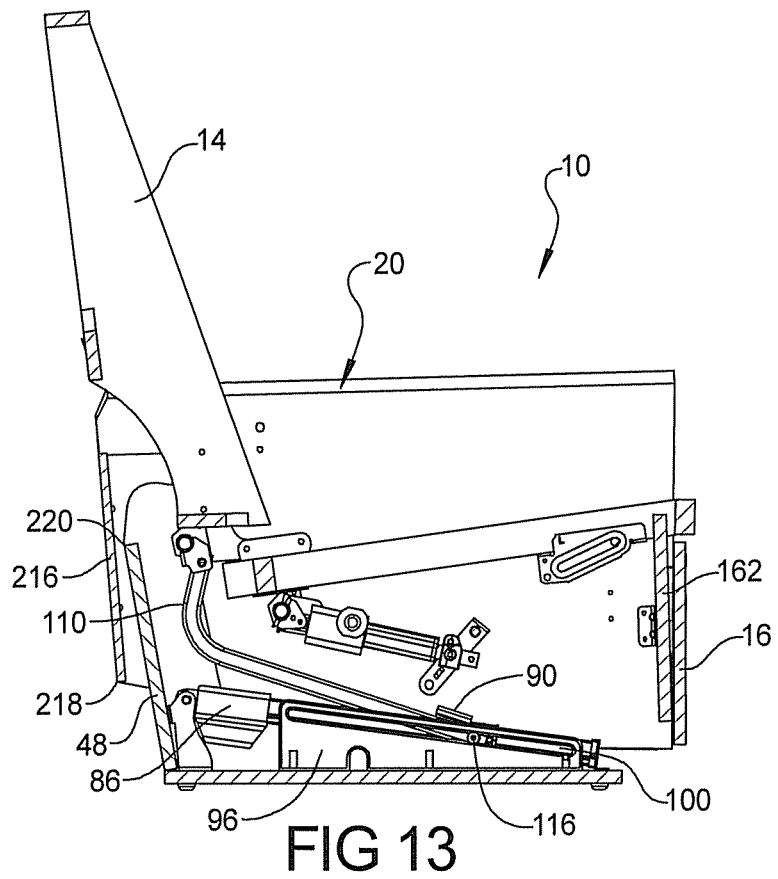
FIG. 13 is a cross sectional right side elevational view taken at section 13 of FIG. 12.
Figure 14:
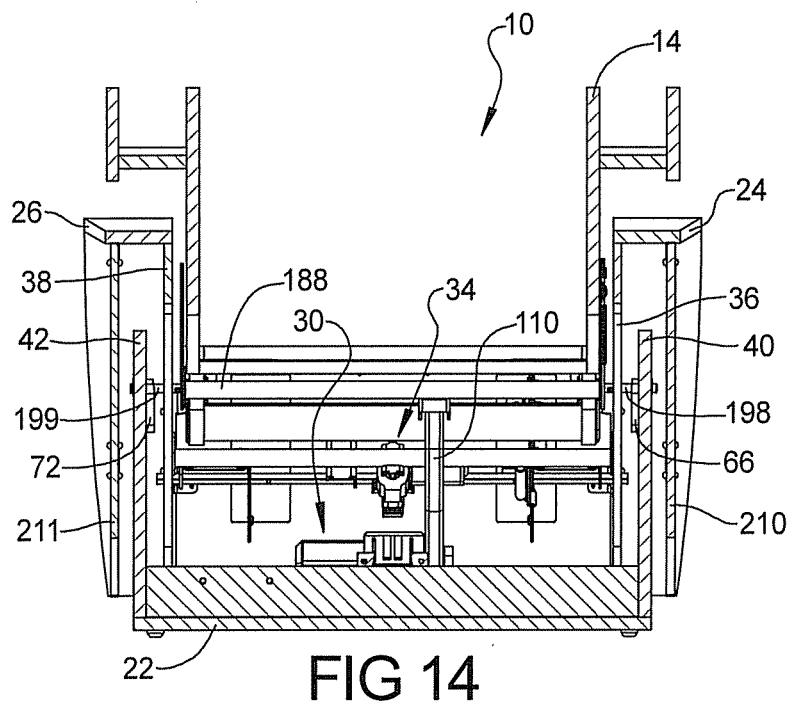
FIG. 14 is a cross sectional rear elevational view taken at section 14 of FIG. 12.

Referring to FIG. 14 and again to FIG. 13, a first portion of the weight of the occupant of lift chair 10 is partially distributed by the first and second shaft extension portions 198, 199 of support shaft 172 to each of the first and second base frame members 40, 42. A second portion of the occupant weight is distributed, as previously described herein, via tube assembly 188 and lift tube 110, to the components of lift mechanism portion 30 and thereby to base platform 22. As evident in FIG. 14, the first base frame member 40 is positioned in a cavity between first inner arm rest member 36 and arm rest outer frame 210 of first arm rest portion 24. Similarly, the second base frame member 42 is positioned in a cavity between second inner arm rest member 38 and an arm rest outer frame 211 (similar to arm rest outer frame 210) of second arm rest portion 26.

Referring to FIG. 15 and again to FIG. 2, when lift chair 10 is positioned at the maximum lift position by rotation of chair portion 20 about frame rotational axis 32, a lower end 222 of leg rest member 16 is still provided with clearance to base platform 22. It is noted again that the full lift position for lift chair 10 is achieved only with leg rest member 16 in the fully stowed position.

Figure 15:
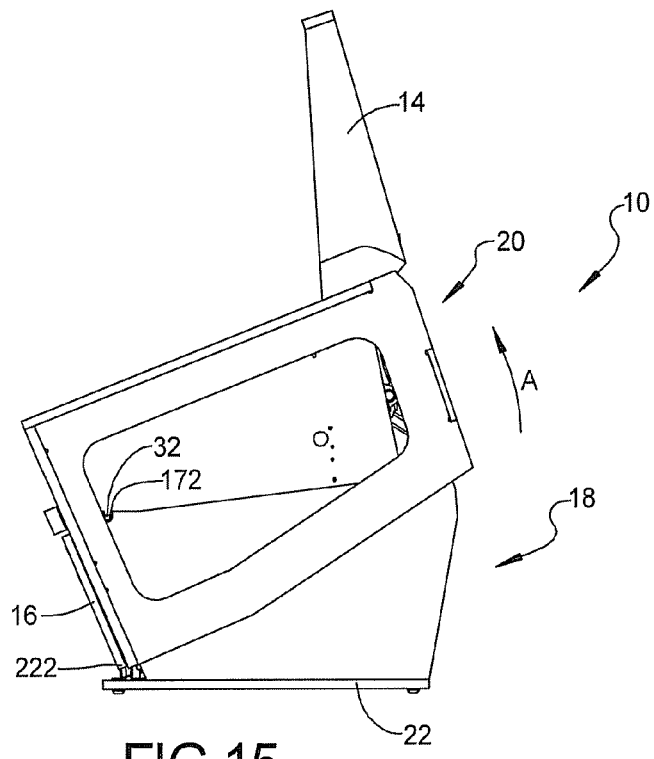
FIG. 15 is a left side elevational view of the furniture member of FIG. 2.

Referring to FIG. 16 and again to FIGS. 3 and 15, the orientation of the frame member forward edge 54 of both the first and second base frame members 40, 42 at angle α and the rearward positioning of the intersecting corner 53 with respect to frame member forward edge 54 provides additional clearance for the occupant's feet to be moved rearward to a position which is closer to the center of gravity of the occupant to aid in standing up from the lift chair full lift position. At the full lift position, second shoulder bolt 154 is positioned at a fully rearward end of elongated slot 102 and can be in direct contact with a slot rear end wall 224 of elongated slot 102. The first shoulder bolt 116 (not visible in this view) is similarly positioned with respect to first elongated slot 100. The lift tube 110 is therefore providing maximum extension height at clevis 200. At the maximum extension height, a vertical plane 226 defined at a forward edge 228 of seat frame 182 is oriented perpendicular with respect to a floor surface 230. The spacing between vertical plane 226 and base platform forward edge 55 provides additional space for the feet of the occupant to be positioned rearward of vertical plane 226 and therefore closer to a center of gravity of the occupant than known lift chairs. This enhances the ability of the occupant to stand and exit lift chair 10.

Figure 4:
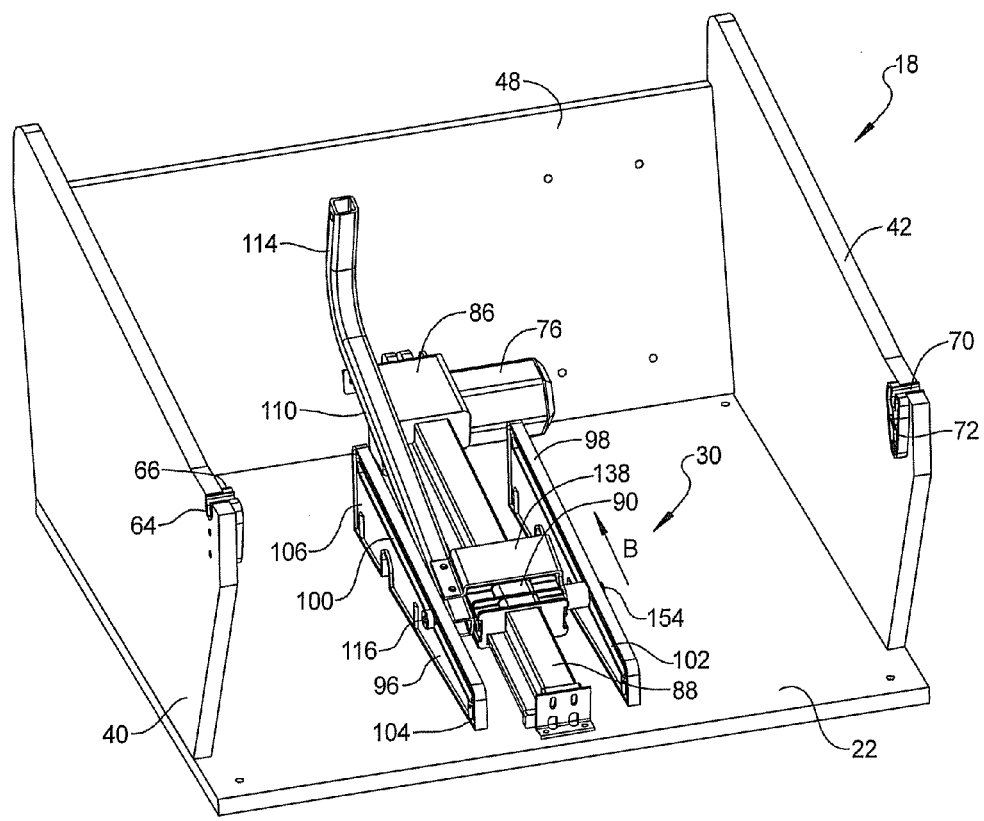
FIG. 4 is the front left perspective view of FIG. 3 showing the assembled power lift mechanism.
Figure 17:
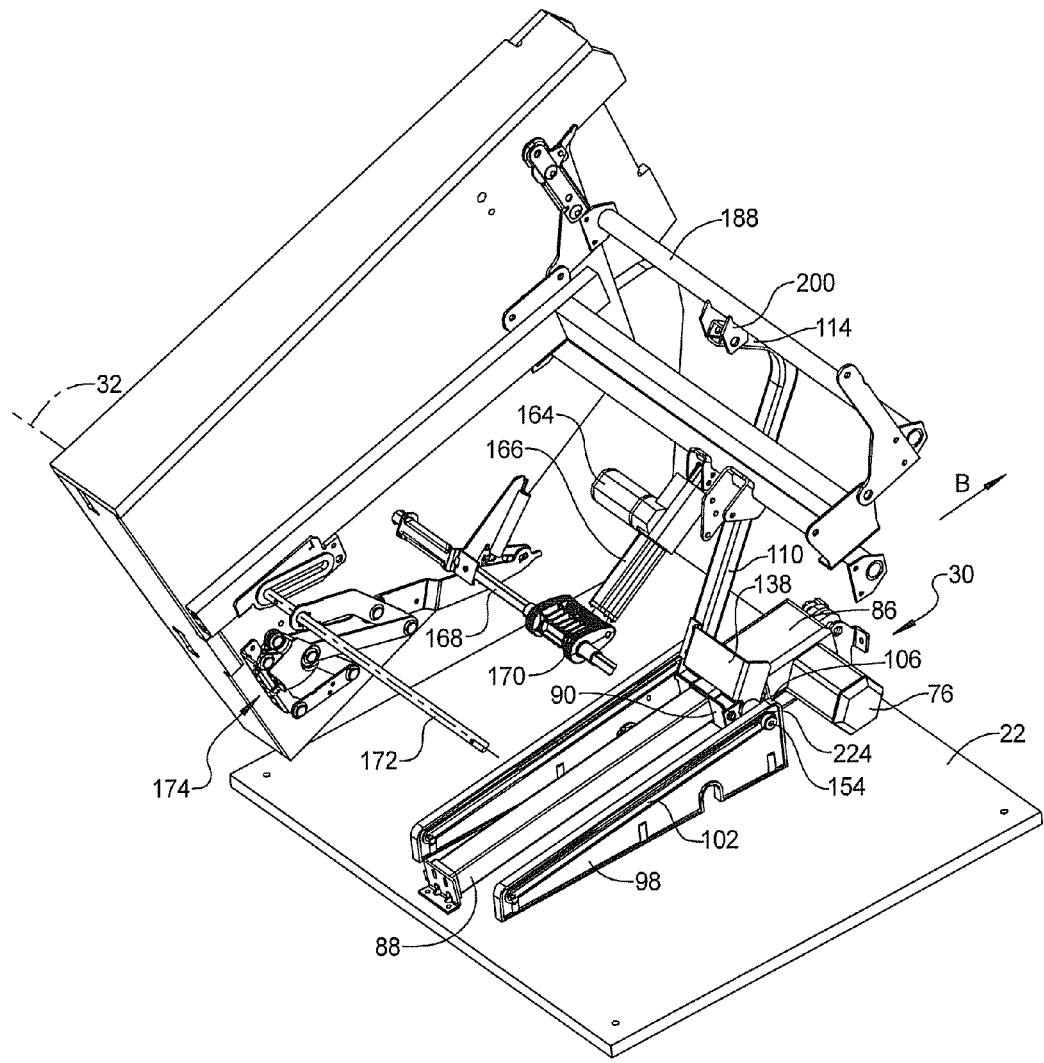
FIG. 17 is a partial front left perspective view of the furniture member of FIG. 2.

Referring to FIG. 17 and again to FIGS. 3 and 4, most of the structural components of lift chair 10 have been removed for clarity such that the right hand components for operation of leg rest member 16 are shown, and the components of lift mechanism portion 30 are visible when left chair is in the maximum lift position. The leg rest drive motor 164 is not operated during the rotation to the lift chair full lift position. The drive rod connecting member 170 is therefore in its fully retracted position as is first pantograph linkage set 174. As worm gear slide 90 is displaced in the slide lifting direction "B", which is rearward with respect to the occupant of lift chair 10, the connection bracket 138 as well as lift tube 110 rotate such that second tube portion 114 connected to clevis 200 provides maximum lift to the tube assembly 188. As worm gear slide 90 moves in the slide lifting direction "B", the shoulder bolts, such as second shoulder bolt 154 shown, slide within the elongated slots, such as elongated slot 102 shown, toward the high elevation end 106 of the first and second guide members 96, 98. The rearward displacement of worm gear slide 90, as well as the increased elevation of the shoulder bolts, provides the maximum lift position. When the shoulder bolts 116, 154 reach the slot rear end wall 224 of each of the respective first and second elongated slots 100, 102, the maximum lift position is reached. Lift chair 10 will remain at the full lift position until the occupant redirects operation of lift motor 76 to return lift chair 10 to the nominal position shown in FIG. 1 or to any of the other operating positions described herein.

Figure 8:
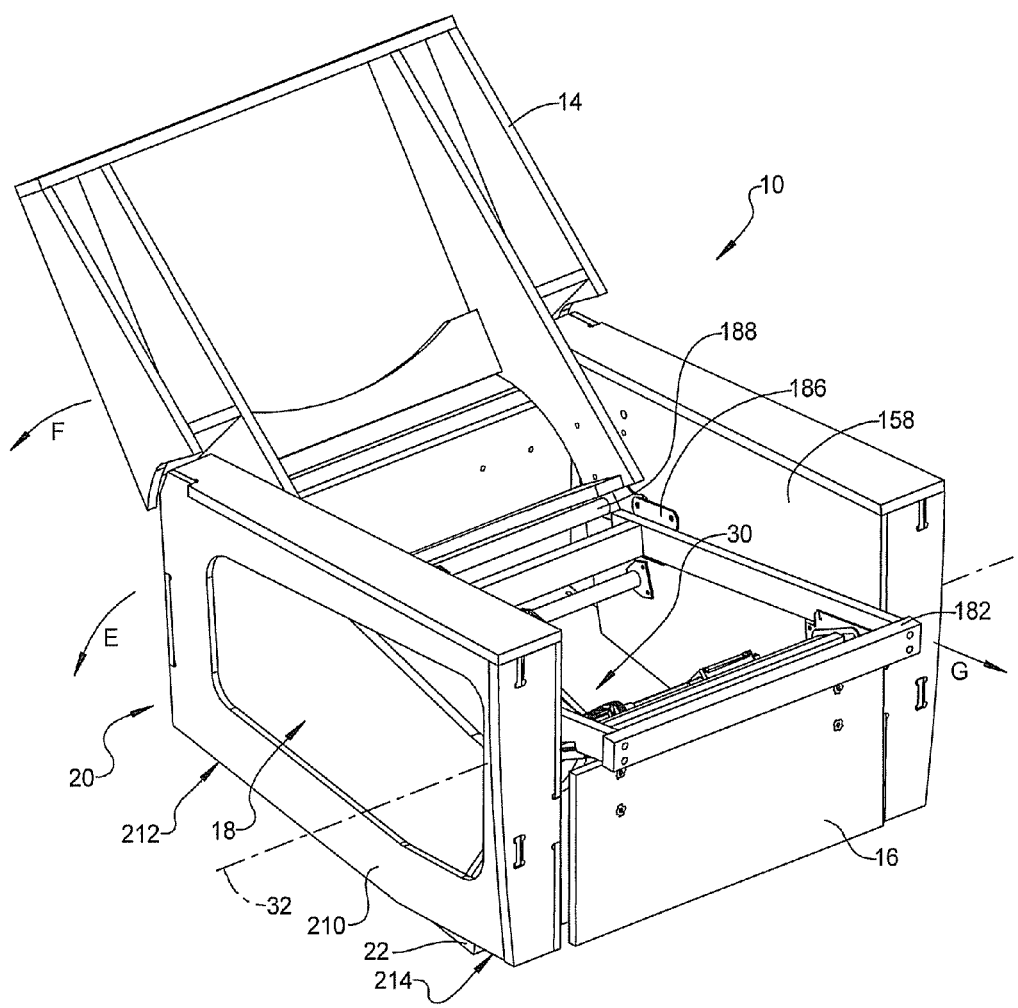
FIG. 8 is a front right perspective view of the furniture member of FIG. 1 in a rearward tilt and seatback rotated position.

Referring to FIG. 18 and again to FIG. 8, in the chair rearward tilt position provided by operation of lift mechanism portion 30, chair portion 20 is rotated in the chair downward rotational direction "E" until the first frame lower face 212 is parallel with or in contact with upper face 58 of base platform 22. The chair rearward tilt position, having seat back assembly 14 in its furthest upright position, results in a lowest position for lift tube 110 with respect to base platform 22. During the transition toward the chair rearward tilt position, the shoulder bolts 116, 154 displace in the first and second elongated slots 100, 102 in the slide returning direction "C", moving toward a slot forward end wall 232. At the chair rearward tilt position, the frame member lower end 218 of chair frame rear connecting member 216 is at its lowest elevation position and positioned proximate to base platform 22.

Figure 19:
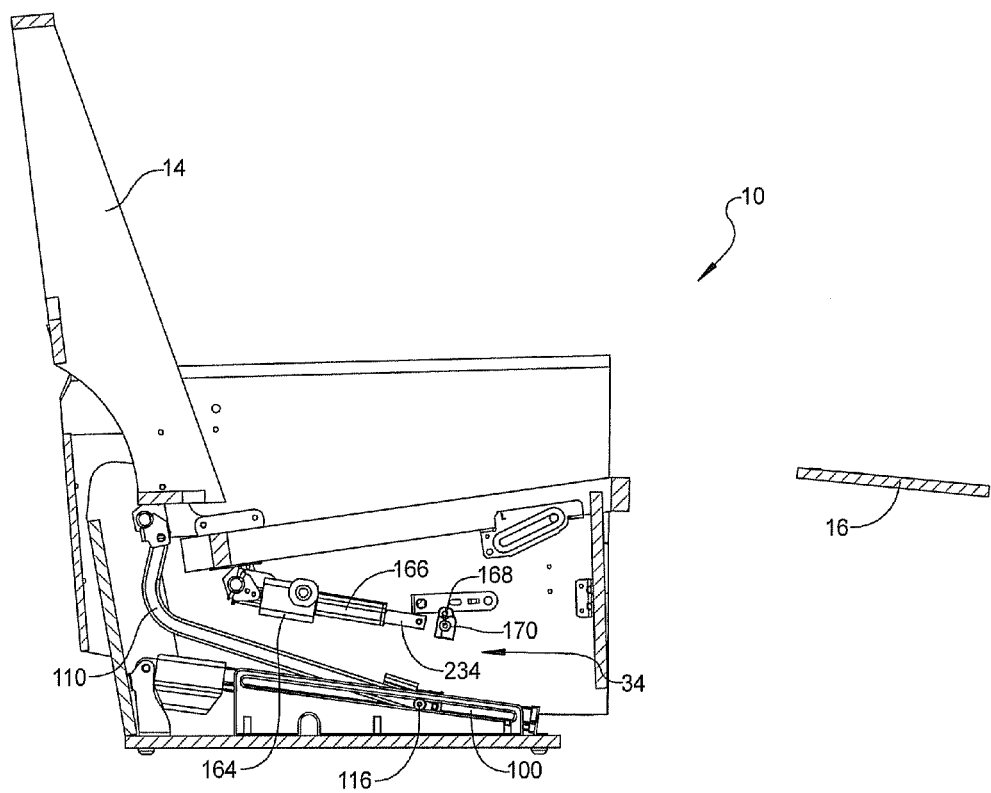
FIG. 19 is a cross sectional right side elevational view of the furniture member of FIG. 13 further showing the chair in a leg rest fully extended position.

Referring to FIG. 19 and again to FIG. 9, in the chair upright leg rest extended position of lift chair 10, the leg rest mechanism portion 34 is operated such that an extending drive shaft 234, extended by operation of leg rest drive motor 164 from drive connecting member 166, displaces drive rod connecting member 170 and thereby rotates drive rod 168. Rotation of drive rod 168, as previously described, extends leg rest member 16 to the fully extended position. Lift tube 110 and the shoulder bolts 116, 154, such as first shoulder bolt 116 shown, are in positions corresponding to the nominal position of lift chair 10 shown in FIG. 1. The only operation required to extend leg rest member 16 is therefore operation of the leg rest mechanism portion 34 by operation of leg rest drive motor 164.

Figure 18:
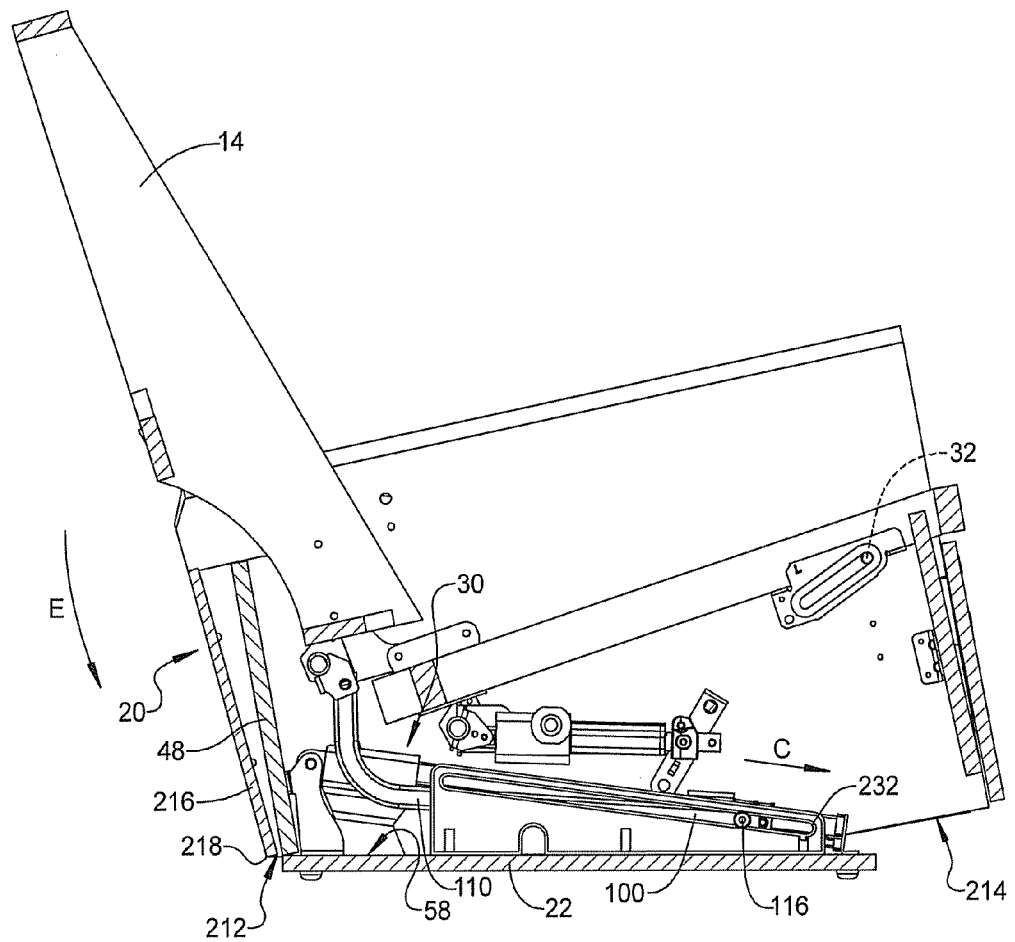
FIG. 18 is a cross sectional right side elevational view of the furniture member of FIG. 13 further showing the chair in a rearward tilt position.

Referring to FIG. 20 and again to FIG. 18, to change from the chair rearward tilt position shown in FIG. 18 to further achieve the maximum seat back assembly 14 rearward rotation in the seat back reclining direction "F", lift mechanism portion 30 is operated to displace worm gear slide 90 in the slide returning direction "C" further forward than its position in the nominal position of lift chair 10. Worm gear slide 90 therefore moves in the slide returning direction "C" until the shoulder bolts 116, 154, such as first shoulder bolt 116 shown, contact the slot forward end wall 232 of the first and second elongated slots 100, 102. At this position, lift tube 110 is elevated compared to the chair rearward tilt position shown in FIG. 18, which allows the full rearward rotation of seat back assembly 14 and forward displacement of seat frame 182 in the seat frame extending direction "G". Again, a maximum chair rearward tilt position can be achieved while the leg rest member 16 is in its fully stowed position.

Figure 20:
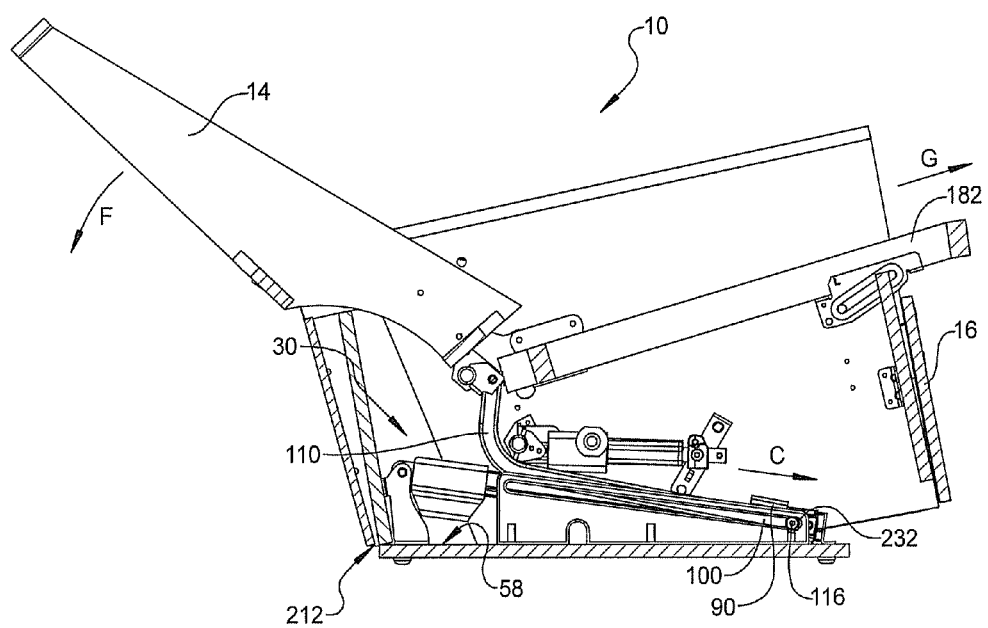
FIG. 20 is a cross sectional right side elevational view of the furniture member of FIG. 18 further showing the chair in a seatback fully reclined position.
Figure 21:
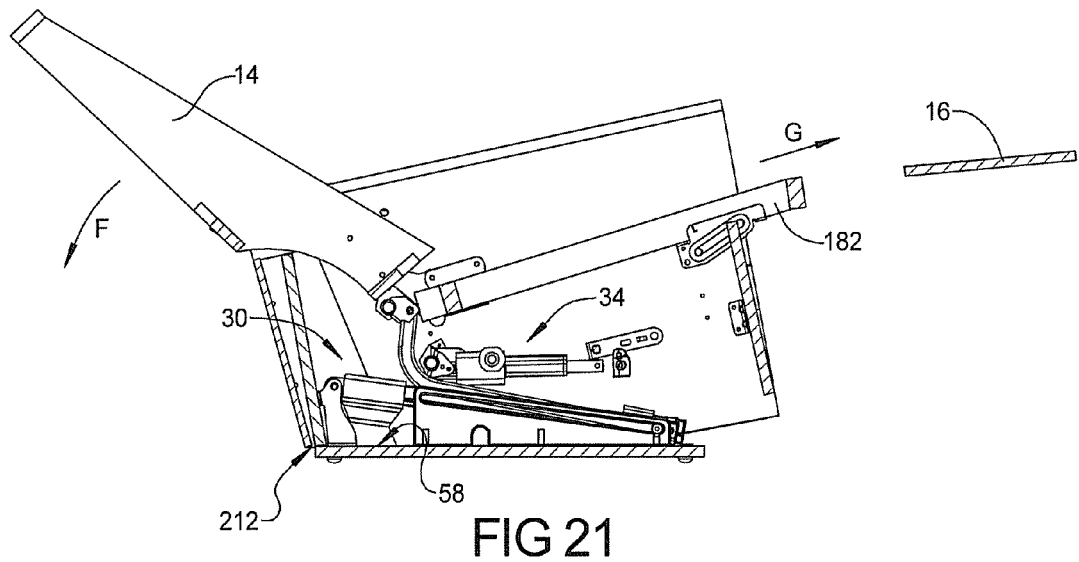
FIG. 21 is a cross sectional right side elevational view of the furniture member of FIG. 20 further showing the chair in a leg rest fully extended position.

Referring to FIG. 21 and again to FIG. 20, to change from the maximum chair rearward tilt position shown in FIG. 20 to further include the full extension of leg rest member 16, when the operation of lift mechanism portion 30 is completed, leg rest mechanism portion 34 can be further operated to extend leg rest member 16 to its fully extended position shown.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. The terms "forward" and "rearward" as used herein refer to directions faced by an occupant of the furniture member (forward) and behind the occupant (rearward) in a seated position of the occupant.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lift chair comprising:
 a rotatable frame assembly including a chair portion and a base portion;
 a support shaft connected to the chair portion having first and second extending portions each oppositely extending outward of the chair portion and at least partially extending through the chair portion;
 first and second base frame members of the base portion oriented parallel to each other and each having one of a first and a second U-shaped journal; and
 the first and second extending portions being individually received in one of the first and second U-shaped journals in an installation direction, the chair portion thereafter rotatably supported by the support shaft with respect to the base portion.

2. The lift chair of claim 1, further including:
 first and second receiving faces each created in one of the first or second base frame members, the first and second receiving faces oriented parallel to each other.

3. The lift chair of claim 2, further including first and second connection members each including one of the first and second U-shaped journals and each connected to one of the first and second receiving faces.

4. The lift chair of claim 2, further including:
 a first receiving slot having a generally U-shape created partially in and extending downwardly from the first receiving face, the first receiving slot slidably receiving the first U-shaped journal; and
 a second receiving slot having a generally U-shape created partially in and extending downwardly from the second receiving face, the second receiving slot slidably receiving the second U-shaped journal.

5. The lift chair of claim 2, wherein each of the first and second receiving faces is oriented parallel with respect to an upper face of a base platform of the base portion, and each is positioned proximate to a frame member forward edge of one of the first and second base frame members.

6. The lift chair of claim 1, wherein the first and second extending portions are received in the first and second U-shaped journals using a frictional snap fit to resist release in a direction opposite to the installation direction.

7. The lift chair of claim 1, further including a mechanism having a leg rest mechanism portion connected to the chair portion and a lift mechanism portion supported by the base portion, the leg rest mechanism portion including a drive rod connected to first and second pantograph linkage sets and rotatable relative to the chair portion to extend and retract first and second pantograph linkage sets, the first and second pantograph linkage sets also connected to and supported by the support shaft.

8. A lift chair comprising:
 a frame assembly including a chair portion rotatable with respect to a base portion, the base portion defining a four-sided wood structure, including:
  first and second base frame members oriented parallel to each other;
  a rectangular shaped base platform supported on a floor oriented perpendicular to the first and second base frame members, the base platform including first and second opposing parallel surfaces, the first and second surfaces having larger surface areas than any other surface of the base platform, the first surface facing the floor; and
  a third base frame member defining a rear facing wall of the base portion, the first, second and third base frame members are fixed relative to and extend vertically upward from the second surface of the base platform; and
 a mechanism having a lift mechanism portion positioned in a cavity of the base portion, the lift mechanism portion entirely fixedly connected to the base platform and the third base frame member and rotatably connected to the chair portion, the lift mechanism acting to rotate the chair portion between a nominal position and a raised full lift position.

9. The lift chair of claim 8, wherein the lift mechanism portion includes:
 a lift motor; and
 a drive assembly connected to the lift motor having a slide displaceable in each of a slide lifting direction and oppositely in a slide returning direction by selective operation of the lift motor.

10. The lift chair of claim 9, further including a lift tube connected at a first end to the slide and connected at a second end to the chair portion, the lift tube upon actuation of the lift motor acting to displace the chair portion between the nominal position and the raised full lift position by displacement of the slide in the slide lifting direction.

11. The lift chair of claim 9, wherein a load transferred from an occupant of the chair portion to the slide is supported by the base platform.

12. The lift chair of claim 9, further comprising:
 a seat back assembly forwardly and rearwardly rotated by operation of only the lift mechanism portion;
 a leg rest mechanism portion of the mechanism connected to the chair portion; and
 a leg rest member extended and retracted between a stowed position and an outward extended position by operation of only the leg rest mechanism portion.

13. The lift chair of claim 8, further including a support shaft connected to the chair portion having first and second extending portions each oppositely extending outward of the chair portion and each rotatably connected to one of the first and second base frame members.

14. The lift chair of claim 8, wherein the third frame member is positioned proximate to a base platform rear edge.

15. The lift chair of claim 8, wherein the chair portion is movable to each of a forward lift position and a rearward tilt position by operation of the lift mechanism portion independent of the nominal and the raised full lift positions.

16. The lift chair of claim 8, wherein the chair portion defines a four-sided wood structure, including:
- first and second chair frame members oriented parallel to each other;
- a rear wall member connected between the first and second chair frame members; and
- a front wall member connected between the first and second chair frame members.

17. The lift chair of claim 16, wherein the first and second chair frame members of the chair portion nest within the first and second base frame members of the base portion.

\* \* \* \* \*